United States Patent

Rowland

[15] 3,646,608
[45] Feb. 29, 1972

[54] PHASE CONTRAST MICROSCOPE ILLUMINATOR

[72] Inventor: Howard J. Rowland, Newton Highlands, Mass.
[73] Assignee: Raytheon Company, Lexington, Mass.
[22] Filed: June 10, 1969
[21] Appl. No.: 831,896

[52] U.S. Cl. ...................................350/87, 350/13, 350/235
[51] Int. Cl. .........................................................G02b 21/06
[58] Field of Search .........................350/235–238, 157–159, 350/162, 12, 13, 87; 356/106, 112

[56] References Cited

UNITED STATES PATENTS

| | | | |
|---|---|---|---|
| 3,122,601 | 2/1964 | Williams | 356/112 |
| 3,146,294 | 8/1964 | Koester et al. | 356/106 |
| 3,108,383 | 10/1963 | Gabor | 350/162 |
| 2,655,077 | 10/1953 | Bennett | 350/13 |
| 3,161,717 | 12/1964 | Barabas et al. | 350/13 |

OTHER PUBLICATIONS

Jenkins and White, " Fundamentals of Optics," 1957, pp 254, 255 McGraw- Hill, N.Y.
Jenkins and White, " Fundamentals of Optics," 1957, pp. 254, 255, McGraw- Hill, N.Y.

Primary Examiner—David Schonberg
Assistant Examiner—Michael J. Tokar
Attorney—Joseph D. Pannone and Harold A. Murphy

[57] ABSTRACT

A phase contrast microscope illuminator in which a transparent stop positioned within a collimated light beam is focused upon a specimen plane aperture. In the absence of a specimen within the aperture, the objective field of the microscope objective lens system appears bright. A specimen actually within the aperture is illuminated by light from the focused beam. It is also illuminated by the focused phase shifted portion of the beam. Phase contrast is assured by varying the transmissivity of the stop. In this regard, the amplitude of the phase shifted portion of the light beam is set equal to the amplitude of the diffracted light entering the objective lens system. A planar reflector with a movable central portion serves as another embodiment of the invention.

4 Claims, 5 Drawing Figures

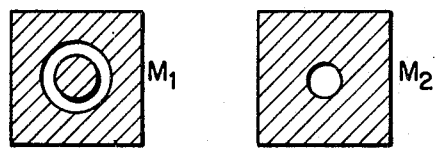
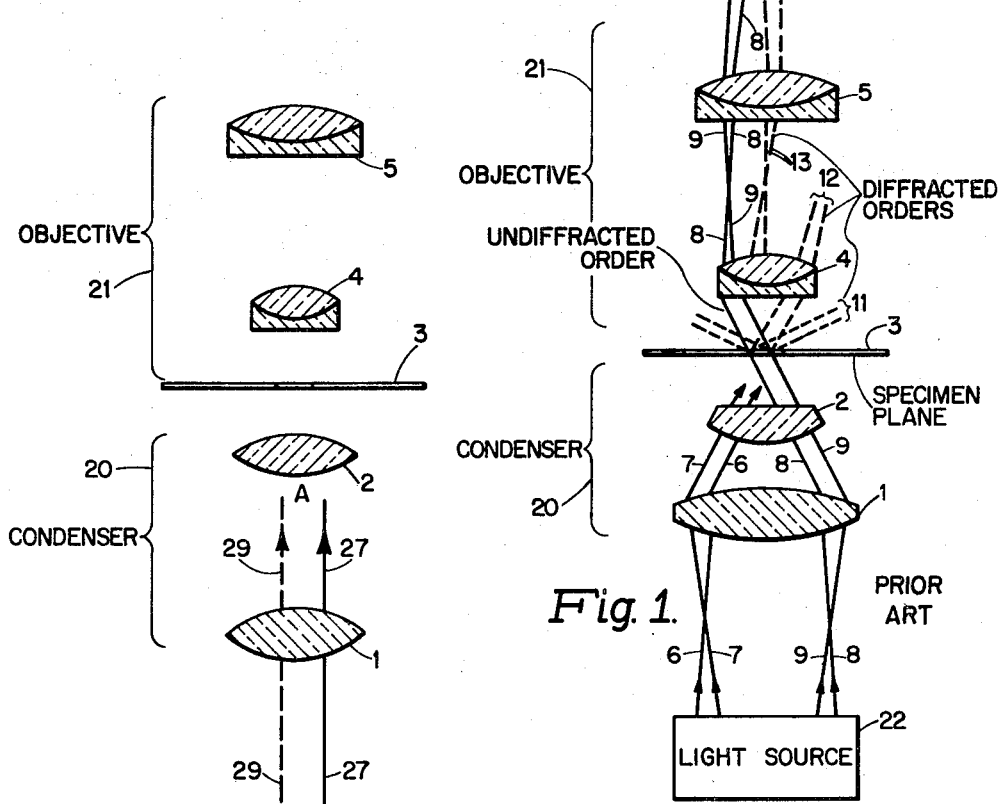
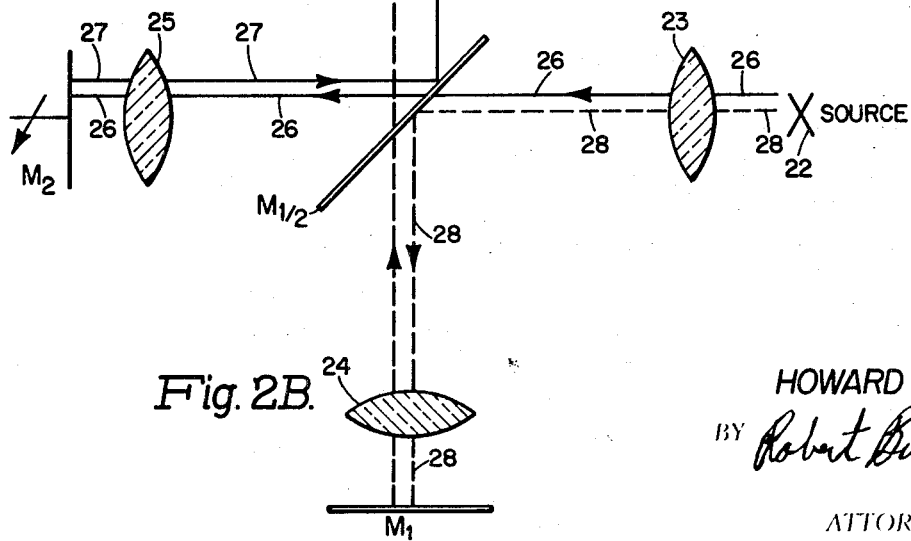
Fig. 2A.
Fig. 1. PRIOR ART
Fig. 2B.
INVENTOR
HOWARD J. ROWLAND
BY Robert Bruce Brodie
ATTORNEY INVENTOR
HOWARD J. ROWLAND
BY *Robert Bruce Brodie*

ATTORNEY

PHASE CONTRAST MICROSCOPE ILLUMINATOR

BACKGROUND OF THE INVENTION

This invention relates to a phase contrast illuminator for use with a microscope objective lens system optically alignable with the aperture of a specimen plane.

When a speck is placed on a back lighted transparent slide it will absorb a small amount of light and diffract other light. A lens may be used to focus the light going through the speck onto the image plane. A black spot may conveniently be considered as a 180° phase shifter of light. It should be recalled that a black spot on the image plane is not as black as on the back lighted transparent slide. This reduction of image blackness occurs because some of the diffracted light does not go through the focusing lens. Thus, the blacker the object or speck, the stronger the diffracted rays are.

In a situation where the refractive index of an object or speck is equal to the refractive index of the surrounding medium, then the object virtually disappears. That is, there is no visual discrimination. Such a case, however, does not realistically arise. There is always a small refractive index difference.

In many circumstances the direct and diffracted rays through the object and the focusing lens may not be 180° out of phase. Also, the brightness difference between the object and the background may be very small. Now, if the amplitude of Optics," ray is reduced such as by putting a stop at the lens focus, then the diffracted rays have comparatively greater amplitude. The use of a black stop at the lens focus gives only bright specks at the image plane due to the diffracted light. There is no formation of an image of the specimen. This would suggest the advisability of altering both the relative amplitude and phase between the direct and the diffracted beams. Attention is directed to "The Wave Theory of Microscopic Image Formation" by F. Zernike, published in the volume "Concepts of Classical Optics", 1958, W. H. Freeman & Co., New York, pp. 525–536, for additional aspects of this problem.

In the prior art, relative amplitude and phase changes show up as differences in contrast. Thus, trying to improve the imagery in the ordinary optical microscope by the insertion of an internal phase plate such as by etching on the top of a microscope objective lens results in both degraded performance and increased cost.

SUMMARY OF THE INVENTION

It is, accordingly, an object of this invention to devise a phase contrast microscope illuminator in which the phase contrast between a specimen in the aperture of the specimen plane may be more efficiently illuminated without intervention of means internal to the microscope objective lens system.

It is a related object of this invention that the phase contrast microscope illumination means be adapted to utilize both transmitted and reflected light.

It is yet another object of this invention that the illuminator be adapted to control both the relative phase between direct and diffracted light in addition to the amplitude thereof.

The aforementioned objects of this invention are satisfied in embodiments which utilize transmitted and reflected light. In the transmitted light embodiment, a microscope objective lens system is optically aligned with the aperture of a specimen plane. An optically permeable stop is positioned within the beam of a collimated light beam source for making a phase angle difference between the beam transmitted through the stop and the remaining portions of the beam. Focusing means are used for focusing the beam transmitted through the stop and the remaining beam upon the specimen plane aperture. In the absence of a specimen, the objective field of the microscope objective lens appears bright. When a specimen appears within the aperture, it is illuminated by the light from the focused remaining beam as well as the focused phase shifted portion of the direct beam or light. If the transmissivity of the permeable stop is varied, then the amplitude of the direct light can be made approximately equal to the diffracted light appearing within the objective lens.

In the reflected light embodiment of this invention, a planar reflector having a center portion thereof relatively movable in a transverse direction to the reflector is positioned with respect to the collimated light beam source so as to reflectively illuminate the specimen plane aperture. In this embodiment, a planar reflector having a center portion thereof relatively movable in a transverse direction to the reflector is positioned within the collimated light beam to reflectively illuminate the specimen plane aperture. In this embodiment, relative phase shift between light reflected at the movable center portion and the outer portion of the planar reflector is achieved by virtue of the distance and time. Relative amplitude control may be achieved by altering the reflectivity of the center portion to equalize the direct reflected light phase delay with the amplitude of the diffracted light from the specimen entering the objective lens.

The control of relative amplitude may alternatively be accomplished in the transmitted light embodiment by making the optically permeable stop from polarizing material. A polarizer inserted between the objective lens system and its image plane may equalize the relative amplitude between the diffracted light and the direct light entering the objective lens through the rotation of the polarizer. These embodiments produce phase contrast and other types of interference effects without the need for modification of the optical train. Significantly, this invention takes advantage of the fact that it consists of a simple modification of the microscope illuminator and does not involve alteration of the objective lens system.

BRIEF DESCRIPTION OF THE DRAWINGS

FIG. 1 shows a microscope lens system specimen plane and illuminator as found in the prior art.

FIGS. 2A and 2B illustrate an interferometric illuminator embodying the invention.

DESCRIPTION OF THE PREFERRED EMBODIMENTS

Figure 3:
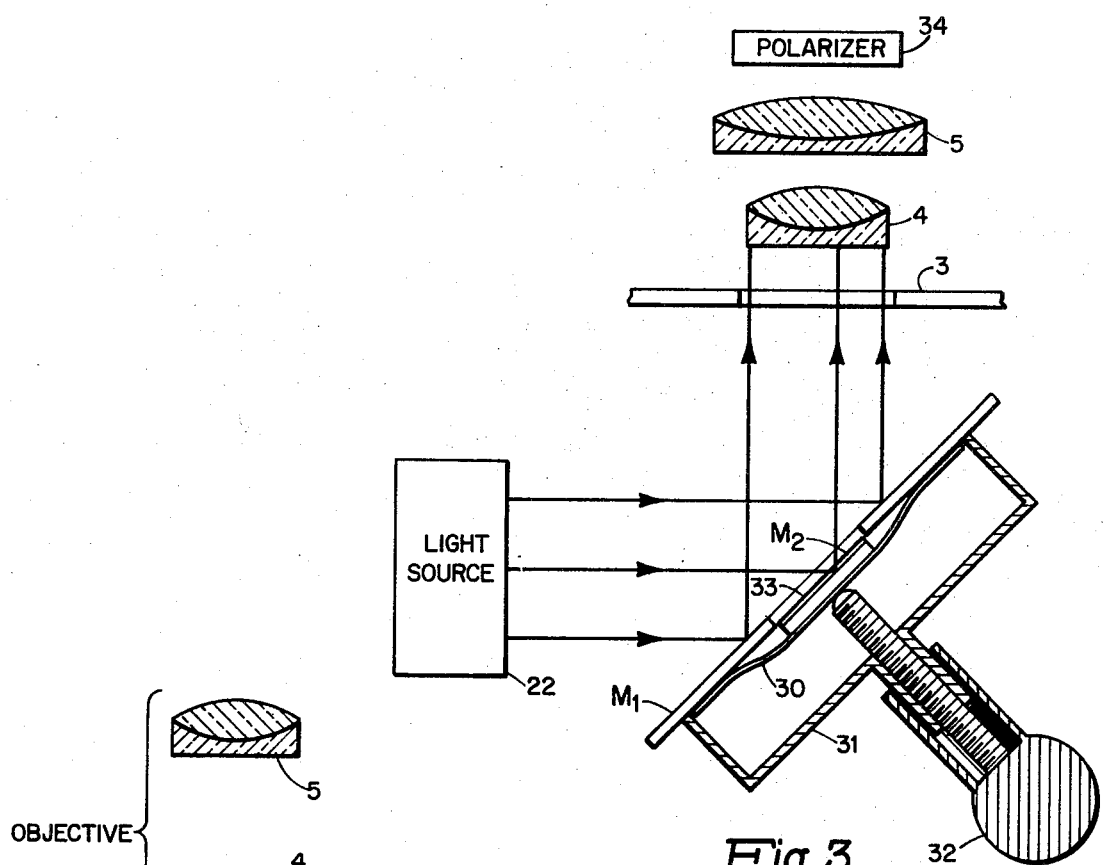
FIG. 3 shows a reflective light embodiment of the invention.

Referring now to FIG. 1 of the drawing, there is shown a prior art microscope and illuminator. A microscope objective lens system 21 is optically aligned with the aperture of a specimen plane 3 which is as illuminated by the collimated light from source 22 as focused upon the aperture by condenser 20. Condenser 20 may comprise focusing lenses such as lenses 1 and 2 optically aligned with the axis of the light beam. Illustratively, light rays 6, 7, 8, and 9 are shown incident upon the aperture of the specimen plane. Now, all of the rays are incident at point p, a specimen in the aperture. The dotted lines 11, 12, and 13 are respectively the diffracted rays. These come together in entering the optical train of the microscope in form and image in the image plane 10. In the usual bright field image, there is some combination of direct ray 8, 9 and diffracted ray 13. For an opaque object on a bright field the diffracted ray is relatively strong and can be represented by a vector which is 180° out of phase with the direct ray. Therefore, a contrast can readily be seen because the diffracted ray destructively interferes with the direct ray in the image plane.

For a transparent object there is no change in amplitude of the direct and diffracted rays but only a phase. If the specimen retards the wave, it can be regarded as being obtained by adding to the original wave another wave of much smaller amplitude and minus 90° in phase. This is spread by diffraction and reunited with the direct ray in the image plane. However, since these rays have just about the same phase as they started out with at the specimen, then the image plane has equal intensity everywhere, that is, no image. If the specimen is illuminated by a cone of light whose angle is everywhere larger than the objective lens will accept (dark field), then both the transparent and opaque particles will appear bright on a dark background.

Now the optical condenser 20 focuses light essentially in the area of the specimen. A cone of light is formed by the condenser and should intercept the objective lens and not be projected outside of the lens for purposes of efficiency. Now, if a stop, such as an optically permeable delay element, were placed on or to the rear of the condenser, then the whole field would be black. As the rear condenser stop decreases in diameter, then the field tends to brighten as the stop diameter approaches zero in the limit. When the stop diameter is zero, then the maximum background field of brightness is attained.

Given a black stop and no specimens in the specimen aperture, then the image field 10 would be all black. When a specimen is placed within the aperture, the light in image plane 10 appears as a light spot (dark field illumination). The area on the back said of the condenser lens 1 controls the direct and the diffracted rays.

Referring now to FIG. 2B of the drawing, there is shown a Michelson type interferometer. Collimated light from source 22 is focused by lens 23 upon a half-silvered mirror $M_{1/2}$ and split two ways. The dotted line designates a ray reflected at mirror $M_1$ while the solid line designates a ray reflected at mirror $M_2$. One ray 28 goes to mirror $M_1$ and the other ray 26 goes to mirror $M_2$. These two mirrors reflect the light back to A whereby adjusting $M_2$ laterally, then the two beams 27 and 29 can be made to have any desired phase relation. They can be made to interfere constructively or destructively.

Referring now to FIG. 2A taken together with FIG. 2B, there are shown the two mirrors $M_1$ and $M_2$. A portion of each mirror is blocked off and a set of conventional lenses is used for imaging these mirrors on the back of the microscope condenser. The ring $M_1$ is made large enough so that its direct rays miss the microscope objective 4 after illuminating the specimen in the aperture of plane 3. This causes the light from $M_1$ to scatter and appear as diffracted light in the objective lens.

In contrast, scattering the and rays would enter from $M_2$. By attenuating the light from $M_2$, the scattered or diffracted light from $M_1$ would be adjusted to a substantially equal magnitude to the direct rays from $M_2$ and by adjusting the placement of $M_2$ the relative phase could be altered in the aperture plane to enable low contrast objects to be seen.

Referring now to FIG. 3 of the drawing, there is shown a planar reflector $M_1$ having a movable center portion thereof 33 capable of movement in a direction perpendicular to the reflector. Reflector $M_1$ is positioned with respect to light source 22 so as to reflect incident light into the aperture of plane 3 entering the objective lens systems 4 and 5. The movable center portion 33 is maintained in place by a disc spring 30 working against a screw bias maintained by element 32. When the mirror $M_2$ is moved, then the path length or phase angle is changed between the light incident upon it and the light hitting mirror $M_1$.

Figure 4:
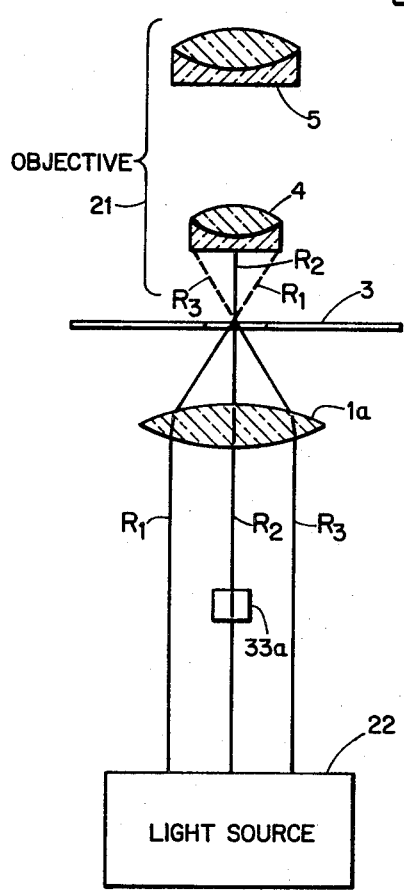
FIG. 4 shows a transmissive light embodiment of the invention.

Referring now to FIG. 4 of the the drawing, there is shown a transmissive optical stop 33A positioned within a light beam exemplified by rays $R_1$, $R_2$, $R_3$ from collimated light source 22. The rays are focused upon the aperture of specimen plane 3. The outer delayed light rays are outside the cone of the objective lens and result only in diffracted light from the specimen in the aperture. The direct delayed light ray $R_2$ illuminates the object specimen. By pivotably mounting and rotating the transparent stop, then the relative phase between the light ray $R_2$ with respect to the rays $R_1$ and $R_3$ can be changed. Amplitude equalization between the delayed direct ray $R_2$ and the diffracted rays entering the objective lens system can be performed by varying the transmissivity of the stop. It should be noted that the maximum contrast occurs where the aforementioned rays are of equal amplitude.

I claim:
1. A phase contrast microscope illuminator comprising:
a source of light providing a beam of collimated rays;
means for supporting an object on the axis of said beam for illumination by said light;
means for phase shifting the transmission of such ones of said rays as are located on and near the axis of said beam while permitting the outer rays to progress substantially unaffected by said phase shifting means; and
means for focusing said phase shifted rays and said un phase shifted rays upon said object to provide substantially equal illumination of said object by said phase shifted rays and said un phase shifted rays.

2. The system according to claim 1 further comprising means responsive to defracted light of said phase shifted rays for viewing said object.

3. In combination:
a source of radiation providing a beam of collimated rays;
first means for directing an annular portion of said rays towards an object;
second means for directing a portion of said rays enclosed within said annular portion towards said object, said portion comprising the central area of said beam; and
means interconnecting said first and said second directing means for varying the path length between said source and said object of rays directed by said second directing means relative to the path length of rays directed by said directing means, such that the phase relationship between said rays directed by said first directing means is shifted with respect to the phase of said rays directed by said second directing means.

4. The device according to claim 3 further comprising means responsive to a difference in phase of rays directed by said first and said second directing means for forming an image of said object.

* * * * *

UNITED STATES PATENT OFFICE
CERTIFICATE OF CORRECTION

Patent No. 3,646,608    Dated February 29, 1972

Inventor(s) Howard J. Rowland

It is certified that error appears in the above-identified patent and that said Letters Patent are hereby corrected as shown below:

In the Specification

Column 1, line 27, change "Optics,'" to -- the direct --.

Column 2, line 45, cancel "as".

Column 3, line 5, change "black" to -- blank --.

Column 3, line 13, change "said" to -- side --.

Column 3, line 34, omit "the" and in the same line after "and" insert -- direct --.

Column 4, line 7, after "$R_2$" insert -- also --.

In the Claims

Column 4, line 43, Claim 3, before "directing" insert -- first --.

Signed and sealed this 27th day of March 1973.

(SEAL)
Attest:

EDWARD M. FLETCHER, JR.
Attesting Officer

ROBERT GOTTSCHALK
Commissioner of Patents